United States Patent
Samingprai et al.

(10) Patent No.: US 9,096,696 B2
(45) Date of Patent: Aug. 4, 2015

(54) HIGH ACTIVITY OLEFIN POLYMERIZATION CATALYST COMPROMISING BORON-CONTAINING SILICA SUPPORT AND THE PREPARATION THEREOF

(75) Inventors: Sutheerawat Samingprai, Bangkok (TH); Onteera Yenjitrattanawalee, Bangkok (TH); Chaya Chandavasu, Bangkok (TH)

(73) Assignee: PTT Global Chemical Public Company Limited, Bangkok (TH)

( * ) Notice: Subject to any disclaimer, the term of this patent is extended or adjusted under 35 U.S.C. 154(b) by 0 days.

(21) Appl. No.: 14/342,568

(22) PCT Filed: Sep. 5, 2012

(86) PCT No.: PCT/TH2012/000042
§ 371 (c)(1),
(2), (4) Date: Mar. 4, 2014

(87) PCT Pub. No.: WO2013/036211
PCT Pub. Date: Mar. 14, 2013

(65) Prior Publication Data
US 2014/0213438 A1    Jul. 31, 2014

(30) Foreign Application Priority Data
Sep. 5, 2011 (TH) .............................. 1101001885

(51) Int. Cl.
*B01J 21/08* (2006.01)
*B01J 23/02* (2006.01)
(Continued)

(52) U.S. Cl.
CPC . *C08F 4/646* (2013.01); *C08F 4/18* (2013.01); *C08F 10/00* (2013.01)

(58) Field of Classification Search
USPC ......... 502/203, 226, 227, 240, 242, 251, 263, 502/340, 350
IPC ........ B01J 21/063, 21/08, 23/02, 27/10, 27/138, B01J 37/00, 37/0207, 37/0217, 37/08
See application file for complete search history.

(56) References Cited

U.S. PATENT DOCUMENTS 2,349,904 A  *  5/1944  Hachmuth ................... 585/530
2,892,826 A  *  6/1959  Peters et al. .................. 526/95
(Continued)

FOREIGN PATENT DOCUMENTS

EP    0032308 A2    7/1981
WO    2013/036211   *  3/2013  ............. C08F 10/00

OTHER PUBLICATIONS

International Preliminary Report on Patentability and Written Opinion dated Mar. 12, 2014 in International Application No. PCT/TH2012/000042.

(Continued)

Primary Examiner — Patricia L Hailey
(74) Attorney, Agent, or Firm — Kim Winston LLP

(57) ABSTRACT

The present invention relates to a high activity olefin polymerization catalyst comprising a boron-containing silica support and the preparation thereof. This invention is characterized in that the support is heat treated in combination with a chemical treatment using a boron compound. The boron compound used in the chemical treatment of this invention is boron halide, preferably boron trichloride. The catalyst of this invention has the weight of boron comparing with the support is 0.5 to 0.7% and has the weight of the boron relative to the catalyst of 0.1 to 0.5%. The catalyst of this invention has chemical compositions comprising:—Boron 0.1-0.5% wt;—Titanium 4-6% wt;—Magnesium 2-6% wt;—Chloride 15-25% wt.

26 Claims, 12 Drawing Sheets

(51) Int. Cl.

| | | |
|---|---|---|
| *B01J 27/10* | (2006.01) | |
| *B01J 27/138* | (2006.01) | |
| *B01J 37/00* | (2006.01) | |
| *B01J 37/08* | (2006.01) | |
| *B01J 21/02* | (2006.01) | |
| *B01J 27/135* | (2006.01) | |
| *B01J 21/00* | (2006.01) | |
| *B01J 23/06* | (2006.01) | |
| *C08F 4/646* | (2006.01) | |
| *C08F 10/00* | (2006.01) | |
| *C08F 4/18* | (2006.01) | |

(56) References Cited

U.S. PATENT DOCUMENTS

| | | | |
|---|---|---|---|
| 2,898,326 A * | 8/1959 | Peters et al. | 526/104 |
| 2,938,001 A * | 5/1960 | De Rosset | 502/206 |
| 2,999,074 A * | 9/1961 | Bloch et al. | 502/227 |
| 3,280,096 A * | 10/1966 | Mackenzie | 526/96 |
| 4,379,758 A * | 4/1983 | Wagner et al. | 502/104 |
| 4,626,520 A | 12/1986 | Best | |
| 4,968,653 A | 11/1990 | Meverden et al. | |
| 5,607,890 A * | 3/1997 | Chen et al. | 502/202 |
| 6,228,792 B1 | 5/2001 | Carney | |
| 6,323,148 B1 | 11/2001 | Reinking | |
| 7,259,125 B2 | 8/2007 | Apecetche et al. | |
| 2001/0014727 A1* | 8/2001 | Costa et al. | 526/221 |
| 2006/0234856 A1* | 10/2006 | Masino | 502/103 |
| 2007/0260074 A1* | 11/2007 | Buijink et al. | 549/529 |

OTHER PUBLICATIONS

Böhm, Ludwig L. "The Ethylene Polymerization with Ziegler Catalysts: Fifty Years after the Discovery." Angew. Chem. Int. Ed. 2003, 42, 5010-5030.

International Search Report dated Dec. 14, 2012 in International Application No. PCT/TH2012/000042.

\* cited by examiner

HIGH ACTIVITY OLEFIN POLYMERIZATION CATALYST COMPROMISING BORON-CONTAINING SILICA SUPPORT AND THE PREPARATION THEREOF

CROSS-REFERENCE TO RELATED APPLICATIONS

This application is a U.S. national phase application under 35 U.S.C. §371 of International Application No. PCT/TH2012/000042 filed on Sep. 5, 2012 which claims priority to Thailand application No. 1101001885, filed Sep. 5, 2011, the entire disclosures of which are hereby incorporated by reference in their entirety.

SUMMARY OF THE INVENTION

The present invention relates to high activity olefin polymerization catalyst comprising boron-containing silica support and the preparation thereof. This invention is characterized in that the support is heat treated in combination with chemical treatment using boron compound.

The Boron compound used in the chemical treatment of this invention is boron halide, preferably boron trichloride.

The catalyst of this invention has the weight of boron relative to the support of 0.5 to 0.7% and has the weight of boron relative to the catalyst of 0.1 to 0.5%.

The catalyst of this invention has chemical composition comprising:

| | |
|---|---|
| Boron | 0.1-0.5% wt |
| Titanium | 4-6% wt |
| Magnesium | 2-6% wt |
| Chloride | 15-25% wt |

In another embodiment, the invention relates to a preparation process of the catalyst for the high activity olefin polymerization comprising boron-containing silica support. The process comprises the following steps:

(a) treating the silica with heat under inert atmosphere;

(b) chemically treating the silica obtained from (a) using boron compound to achieve the boron-containing silica support; and (c) preparing the catalyst from the silica support obtained from (b).

FIELD OF THE INVENTION

Chemistry relates to chemical ingredients and chemical processes of the catalyst preparation for high activity olefin polymerization comprising the boron-containing silica support.

BACKGROUND OF THE INVENTION

It is well understood that configuration and size distribution of polymer and catalyst is correlated. As disclosed in Ludwig L. Bohm, *Angew. Chem. Int. Ed.* 2003, 42, 5010-5030, that is, when the catalyst has sphere configuration and narrow range of size distribution, it will also produce polymer that has sphere configuration and narrow range of size distribution. Therefore, there is an attempt to improve size and configuration of polymer by using high activity catalyst.

Michael John Carney, U.S. Pat. No. 6,228,792 B1 (2001) disclosed the preparation of silica-carrier catalyst that was treated using butyl ethyl magnesium (BEMag). It was found that the catalyst prepared by this method gave a broad size distribution and produced a large amount of dust which was difficult to remove, or it was necessary to use an additional equipment to remove the dust resulting in higher production costs.

Maria A. Apecectche, Phuong A. Cao, et al., U.S. Pat. No. 7,259,125 A1 (2008) disclosed the preparation of catalyst wherein the silica support was prepared by using triethylaluminium as Lewis base. It was found that the catalyst prepared from this method did not provide substantially high activity.

The present invention, therefore, aims to increase the activity of catalyst by using Lewis acid. Meanwhile, the resulting catalyst will have narrow size distribution which will also prevent the problem of dust occurrence.

DETAILED DESCRIPTION OF THE INVENTION

The present invention relates to a catalyst for an olefin polymerization having high activity comprising the boron-containing silica support and the preparation of the catalyst which will be described by the following aspects of this invention.

Any aspects represented herein shall mean to include the application with other aspects of this invention unless it has been specified otherwise.

DEFINITIONS

All technical and scientific terms used herein have the meaning that will be understood by those ordinary skilled in the art unless it has been defined otherwise.

Use of singular nouns or pronouns when used with "comprising" in claims and/or specification means "one" and will also include "one or more", "at least one", and "one or more than one".

Throughout this application, the term "about" used to indicate any value that is appeared or expressed herein may be varied or deviated, which the variation or deviation may occur from the error of instruments and methods used to determine various values.

The terms "comprise", "has/have" and "include" are open-ended verbs, wherein one or more of these verb formats, for example "comprise", "comprising", "has/have", "having", "include", "including" are also open-ended verbs. For example, any method that "comprises", "has" or "includes" one step or more does not limit to one step or steps but also covers the steps that has not been indicated.

Any instrument, equipment, method or reagent mentioned herein, unless indicated otherwise, shall mean instrument, equipment, method or reagent that are generally used or practiced by a person skilled in the art of this field.

Any method, process or step according to any process performed in this invention, unless specifically indicated otherwise, shall mean to perform under an inert atmosphere.

All compositions and/or methods disclosed and claimed in this application are intended to cover aspects of the invention obtained from performing, operating, modifying, changing any factors without experimentations that are significantly different from this invention, and acquire the same which have properties, utilities, advantages and results similar to the aspects of the present invention according to those ordinary skilled in the art even without being indicated in claims specifically. Therefore, the substitution for or similarity to the aspects of the present invention including minor modification or change that can be apparent to a person skilled in the art in this field shall be considered under the intention, concept and scope of this invention as appeared in the appended claims.

The present invention relates to the catalyst for the olefin polymerization having high activity comprising boron-containing silica support and the preparation thereof. This invention is characterized in that the support is heat treated in combination with chemical treatment by using boron compound.

The silica support according to this invention is meant to include silicaceous supports, for example, but not limited to, silica, silica/alumina and silicate of IIA group. Silicate is, for example, but not limited to, calcium metasilicate, pyrogenic silica, high purity silica, and the mixture thereof.

In one embodiment, boron compound used in the chemical treatment of this invention is boron halide, preferably boron trichloride.

The catalyst of this invention has the weight of boron relative to the support of 0.5 to 0.7% and has the weight of boron relative to the catalyst of 0.1 to 0.5%.

The catalyst of this invention has chemical compositions comprising:

| Boron | 0.1-0.5% wt |
|---|---|
| Titanium | 4-6% wt |
| Magnesium | 2-6% wt |
| Chloride | 15-25% wt |

In another embodiment, the invention relates to the preparation process of catalyst for olefin polymerization having high activity comprising boron-containing silica support. The process comprises the following steps:

(a) treating the silica with heat under inert atmosphere;

(b) chemically treating the silica obtained from (a) by using boron compound to achieve boron-containing silica support; and (c) preparing the catalyst from the silica support obtained from (b).

In each step of the preparation of the catalyst of this invention, unless specifically indicated, the solvent may be selected from, but not limited to, aromatic hydrocarbon, chain and cyclic aliphatic hydrocarbon, cyclic olefin and ether, preferably toluene, benzene, ethylbenzene, cumene, xylene, mesitylene, hexane, octane, cyclohexane, methylcyclohexane, hexene, heptene, octene, tetrahydrofuran, etc., most preferably toluene. Any mixtures of these solvents may also be used.

The drying of the mixtures obtained from each preparation step, unless specifically indicated, includes, but not limited to, a conventional drying method in oven, an evaporation by stirring, an evaporation in rotary evaporator, vacuum evaporation, a freeze drying, or a spray drying, etc.

Preparation of the Silica Support

The present invention has prepared the catalyst for olefin polymerization having high activity comprising boron-containing silica support, wherein the support is obtained from the combination of heat and chemical treatment.

Heat Treatment of the Silica

Incineration of the dry solid can be performed in inert gas atmosphere, for example, nitrogen, helium, argon or mixture, of air or mixture.

Incineration may be performed with the flow or stagnate of inert gas. The incineration temperature may be ranged from about 250° C. to about 1000° C., preferably from about 400° C. to about 800° C., most preferably 600° C.

A factor of incineration time is not specifically defined. However, the incineration time may be ranged from about 0.5 hour to about 20 hours, preferably from about 2 hours to about 6 hours, and most preferably 4 hours.

The factor of the incineration heating speed is not defined. However, it may be heated at the rate of between 0.1° C./minute to about 10° C./minute, which is a typical value.

Chemical Treatment of Silica Using Boron Compound

The chemical treatment of this invention uses the boron compound as Lewis acid by using a mole ratio of the silica per the boron compound of 100-300:5-9, preferably 200:7.

The chemical treatment of the silica support according to the invention may be performed as follows:

Treating the surface of the heat-treated silica was carried out by adding hexane 150 ml into $SiO_2$ 14.25 g, then adding $BCl_3$ 7 ml. The mixture was stirred about 30 minutes in an oil bath at 40° C. until the temperature is increased to 70° C., then dried under a vacuum. Hereinafter, the obtained mixture will be called BOS ($BCl_3$-on-silica).

The following examples below show the present invention without limiting the scope of the invention.

(A) Preparation of a Comparative Example Cat NA1 ($SiO_2$/BEMag/$TiCl_4$)

Silica 2 g (0.033 mol) is suspended in heptane 400 ml at a room temperature, after that BEMag 12.2 ml (0.011 mol) is added within 5 minutes. The mixture is then heated by a reflux for 30 minutes, cooled, and then bubble of HCl gas is added into the mixture via a dip tube for 1 hour. After that ethanol 2 ml (0.033 mol) is added at the room temperature and the suspension is heated by reflux for 30 minutes, cooled to the room temperature, and then $TiCl_4$ 8.5 ml (0.078 mol) is added. After the addition is completed, it is then again heated by the reflux for 1 hour, washed the resulting solid 5 times with heptane 100 ml and then dried under a vacuum to give a final product as the flowable solid catalyst.

(B) Preparation of a Comparative Example Cat A1 ($SiO_2$/BEMag/$TiCl_4$)

Heat treated silica 2 g (0.033 mol) is suspended in heptane 400 ml at a room temperature, after that BEMag 12.2 ml (0.011 mol) is added within 5 minutes. The mixture is then heated by a reflux for 30 minutes, cooled, and then bubble of HCl gas is added into the mixture via a dip tube for 1 hour. After that ethanol 2 ml (0.033 mol) is added at the room temperature and the suspension is heated by a reflux for 30 minutes, cooled to the room temperature, and then $TiCl_4$ 8.5 ml (0.078 mol) is added. After the addition is completed, it is then again heated by the reflux for 1 hour, washed the resulting solid 5 times with heptane 100 ml and then dried under a vacuum to give a final product as the flowable solid catalyst.

(C) Preparation of a Comparative Example Cat NA2 ($SiO_2$/$MgCl_2$/$TiCl_4$) Silica 2 g (0.033 mol) is suspended in heptane 400 ml at a room temperature, after that a solution of $MgCl_2$ 1 g (10.5 mmol) in absolute ethanol 6.5 ml (0.1 mol) is added within 5 minutes. The mixture is then heated by a reflux for 30 minutes, cooled to the room temperature, and then $TiCl_4$ 8.5 ml (0.078 mol) is added. After the addition is completed, it is than again heated by the reflux for 1 hour, washed the resulting solid 5 times with heptane 100 ml and then dried under vacuum to give a final product as the flowable solid catalyst.

(D) Preparation of a Comparative Example Cat A2 ($SiO_2$/$MgCl_2$/$TiCl_4$)

Heat treated silica 2 g (0.033 mol) is suspended in heptane 400 ml at a room temperature, after that a solution of $MgCl_2$ 1 g (10.5 mmol) in absolute ethanol 6.5 ml (0.1 mol) is added within 5 minutes. The mixture is then heated by a reflux for 30 minutes, cooled at the room temperature, and then $TiCl_4$ 8.5 ml (0.078 mol) is added. After the addition is completed, it is heated by the reflux for 1 hour, washed the resulting solid 5 times with heptane 100 ml and then dried under a vacuum to give a final product as the flowable solid catalyst.

(E) Preparation of Comparative Example Cat NB1 (SiO$_2$—BCl$_3$/BEMag/TiCl$_4$)

BOS 2 g (0.033 mol) is reacted with BEMag by using the same method shown in (A).

(F) Preparation of Example Cat B1 (SiO$_2$—BCl$_3$/BEMag/TiCl$_4$)

Heat treated BOS silica 2 g (0.033 mol) is reacted with BEMag by using the same method shown in (A).

(G) Preparation of Comparative Example Cat NB2 (SiO$_2$—BCl$_3$/MgCl$_2$/TiCl$_4$)

BOS 2 g (0.033 mol) is reacted with Anh. MgCl$_2$ solution as prepared in (C).

(H) Preparation of Example Cat B2 (SiO$_2$—BCl$_3$/MgCl$_2$/TiCl$_4$)

Heat treated BOS silica 2 g (0.033 mol) is reacted with Anh. MgCl$_2$ solution as prepared in (B).

(I) Preparation of Comparative Example Cat C1 (SiO$_2$-TEA/BEMag/TiCl$_4$)

Treat a Surface of a heat treated silica by using TEA as a Lewis base by adding hexane 150 ml and 23.1 ml of 300 mmol/l of TEA in hexane into the silica 14.25 g respectively. The mixture is stirred for 30 minutes in an oil bath at 40° C. until the temperature increased to 70° C. and then dried under a vacuum. Hereinafter, the mixture obtained will be called TOS (TEA-on silica).

After that, react TOS 2 g (0.033 mol) with BEMag by using the same method shown in (A).

(J) Preparation of a Comparative Example Cat C2 (SiO$_2$-TEA/MgCl$_2$/TiCl$_4$)

TOS 2 g (0.033 mol) is reacted with Anh. MgCl$_2$ solution as prepared in (C).

Polymerization Reaction of Ethylene

The Polymerization reaction of ethylene may be carried out by using the following conditions. This is done by adding hexane, TEA and a catalyst into a reactor then, heating the reactor to a predetermined temperature while ethylene is continuously fed into the reactor. The resulting polymer product is filtered and dried.

| | |
|---|---|
| Size of reactor | 2 L |
| Hexane feed | 1 L |
| Catalyst feed | 0.01 mmol/L |
| Co-catalyst feed | 1 mmol/L |
| Hydrogen feed | 3.5 kgs/cm$^2$ |
| Ethylene feed | 4.5 kgs/cm$^2$ |
| Reaction temperature | 80° C. |
| Reaction time | 120 minutes |

The following advantages and aspects of this invention are currently shown in examples with references to accompanying drawings.

Determination of Chemical Composition of Support and Catalyst

Ti: weight composition of titanium is assessed by UV-Visible spectrometer.

Mg: weight composition of magnesium is assessed by titration with DP5 phototrode.

Cl: weight composition of chloride is assessed by titration with Ag/AgCl Ionic Selective Electrode.

B: weight composition of boron is assessed by ICP-OES, SPECTRO ARCOS, Side On Plasma Observation (Vertical).

Table 1 shows the chemical compositions of the catalyst

| | Chemical compositions of the catalyst (% wt) | | | | |
|---|---|---|---|---|---|
| Example | B | Al | Ti | Mg | Cl |
| Silica without heat treatment | | | | | |
| BOS BCl$_3$ on silica | 0.64 | — | — | — | — |
| Cat NA1 SiO$_2$/BEMag/TiCl$_4$ | — | — | 5.5 | 6.8 | 28 |
| Cat NB1 BOS/BEMag/TiCl$_4$ | 0.16 | — | 3.9 | 4.6 | 19.8 |
| Cat NB2 BOS/MgCl$_2$/TiCl$_4$ | 0.30 | — | 3.1 | 2.5 | 16.9 |
| Silica with heat treatment | | | | | |
| BOS BCl$_3$ on silica | 0.48 | — | — | — | — |
| TOS TEA on silica | — | 1.36 | — | — | — |
| Cat A1 SiO$_2$/BEMag | — | — | 5.6 | 6.4 | 26.1 |
| Cat A2 SiO$_2$/MgCl$_2$ | — | — | 4.7 | 3.9 | 20.8 |
| Cat B1 BOS/BEMag | 0.13 | — | 5.8 | 5.6 | 24.8 |
| Cat B2 BOS/MgCl$_2$ | 0.26 | — | 5.9 | 5.5 | 17.2 |
| Cat C1 TOS/BEMag | — | 0.88 | 6.1 | 6 | 24 |
| Cat C2 TOS/MgCl$_2$ | — | 0.95 | 6.8 | 5.1 | 19.3 |

Study of Catalyst Activities

Ethylene slurry polymerization is carried out with a reactor size 2 L, hexane 1 L, catalyst 0.01 mmol Ti, TEA 1 mmol, H$_2$ 3.5 kgs/cm$^2$, ethylene 4.5 kgs/cm$^2$, temperature 80° C., and reaction time 120 minutes.

Analysis of Surface Area

Surface area of the silica, treated silica and catalyst may be determined by Brunauer-Emmett-Teller (BET) via nitrogen absorption. The results are shown in FIGS. 3 to 7.

Analysis of Particle Size

Particle sizes and size distribution of the particles of the silica, treated silica, catalyst and polymer powder may be determined by Matersizer 2000, MALVERN. The results are shown in FIGS. 3 to 7.

Study of Morphology

The study of morphology of the silica, treated silica, catalyst and polymer powder may be carried out with on Optical Microscope (OM) and a Scanning Electron Microscope (SEM) as shown in FIGS. 8 to 10.

BEST METHOD OF THE INVENTION

Figure 1:
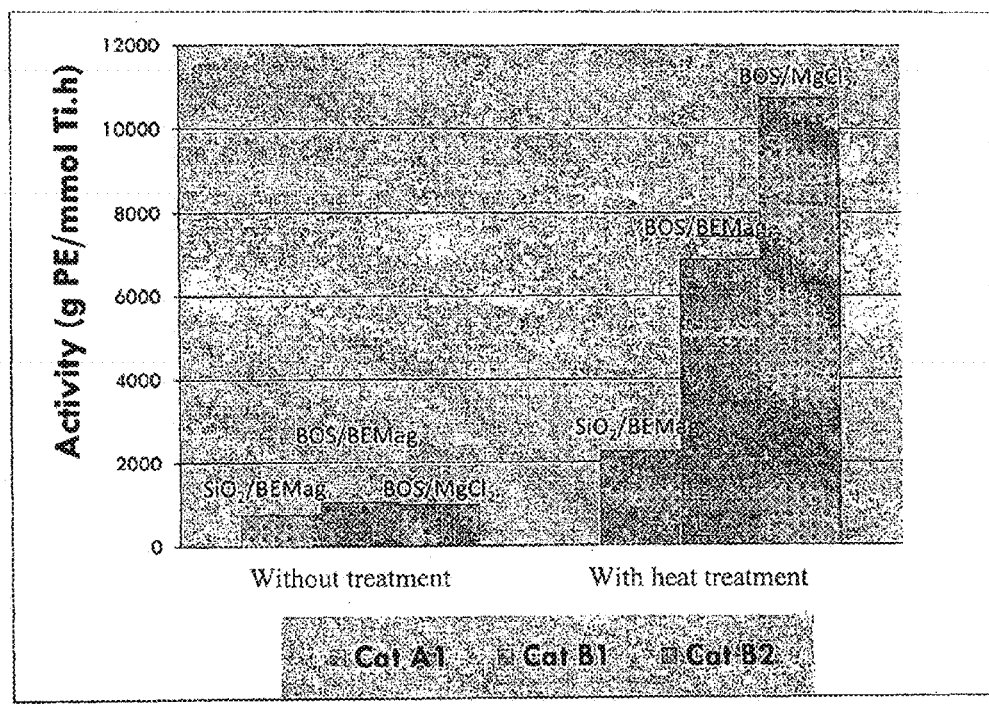
FIG. 1 shows the results of the treatment of silica by heat to the activity of catalysis of the catalyst for the olefin polymerization.
Figure 2:
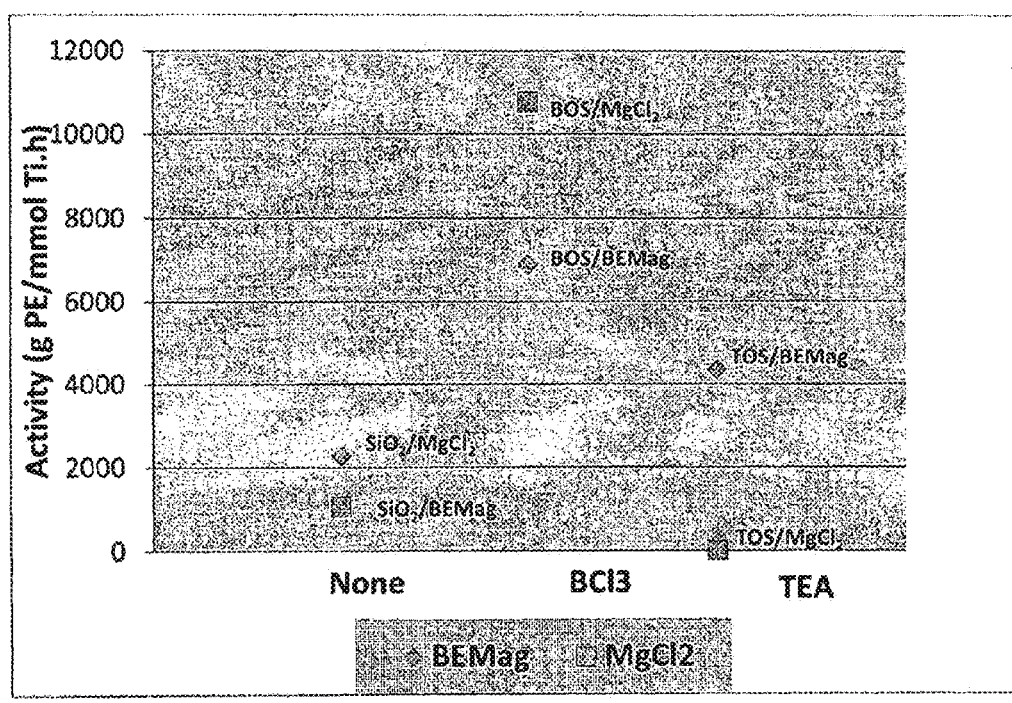
FIG. 2 shows the results of the chemical treatment of the silica.
Figure 3:
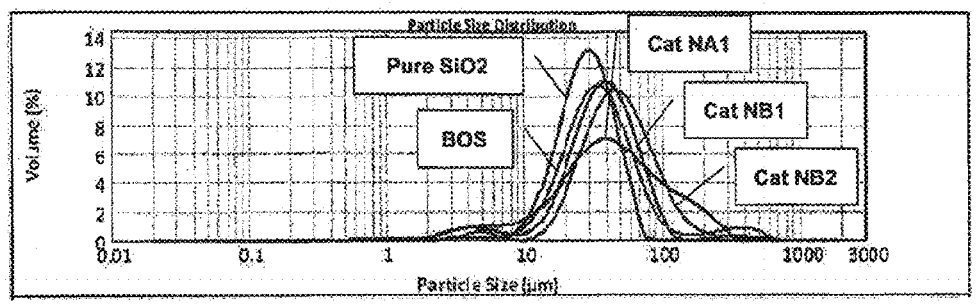
FIG. 3 shows a particle size distribution of the supports without the heat treatment and the catalyst prepared from the support.
Figure 4:
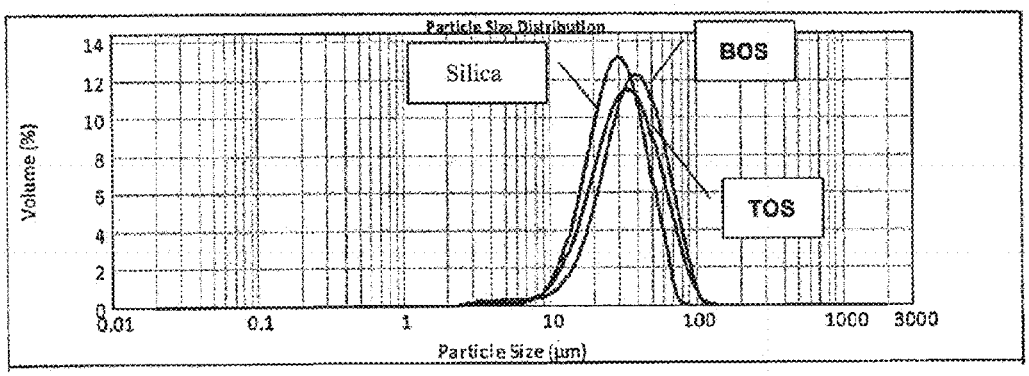
FIG. 4 shows a particle size distribution of the silica, BOS and TOS support.
Figure 5:
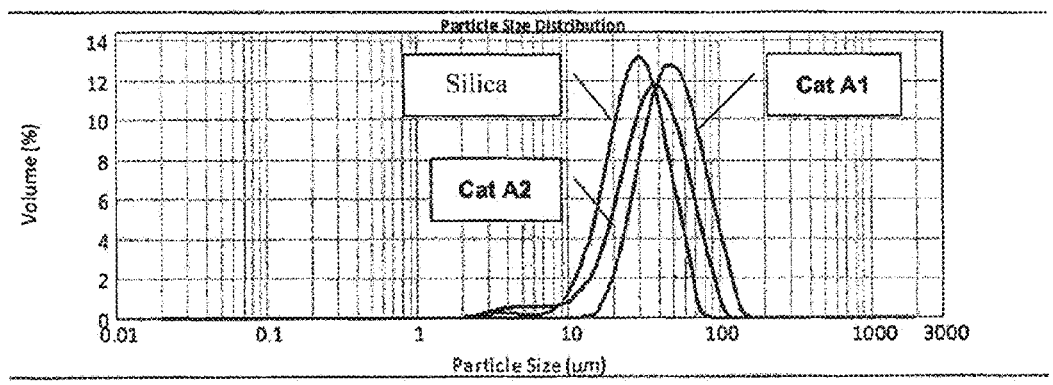
FIG. 5 shows a particle size distribution of the silica, Cat A1 and Cat A2 support.
Figure 6:
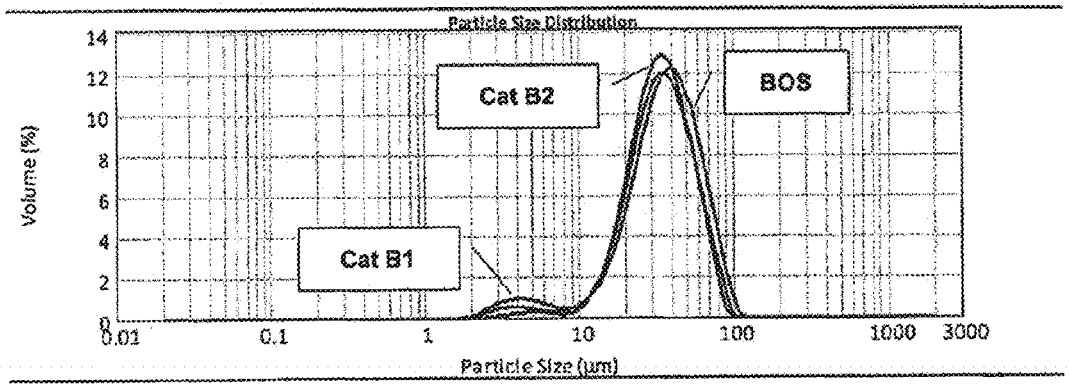
FIG. 6 shows a particle size distribution of BOS, Cat B1 and Cat B2 support.
Figure 7:
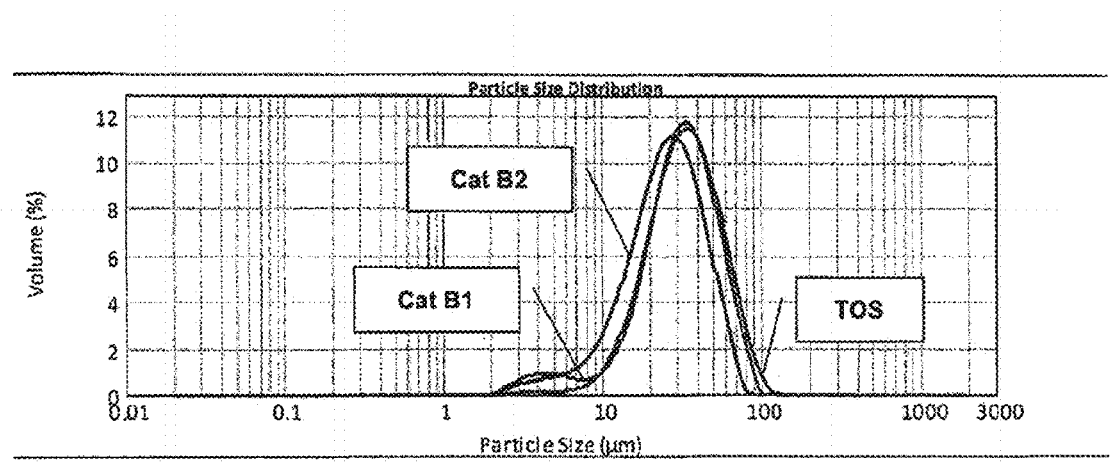
FIG. 7 shows a particle size distribution of TOS, Cat B1 and Cat B2 support.
Figure 8:
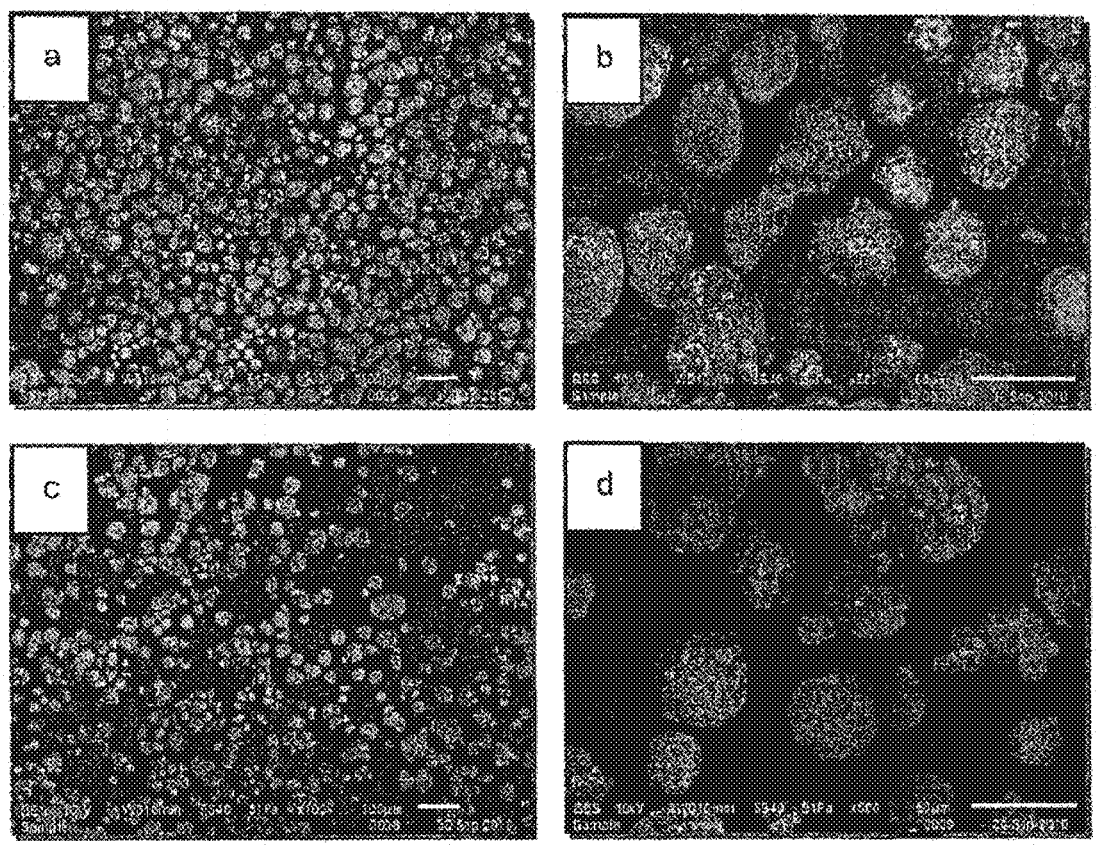
FIG. 8 shows micrographs from SEM of (a) silica without the heat treatment at 100 times magnification; (b) silica without the heat treatment at 500 times magnification; (c) BOS without the heat treatment at 100 times magnification; and (d) BOS without heat treatment at 500 times magnification.
Figure 9:
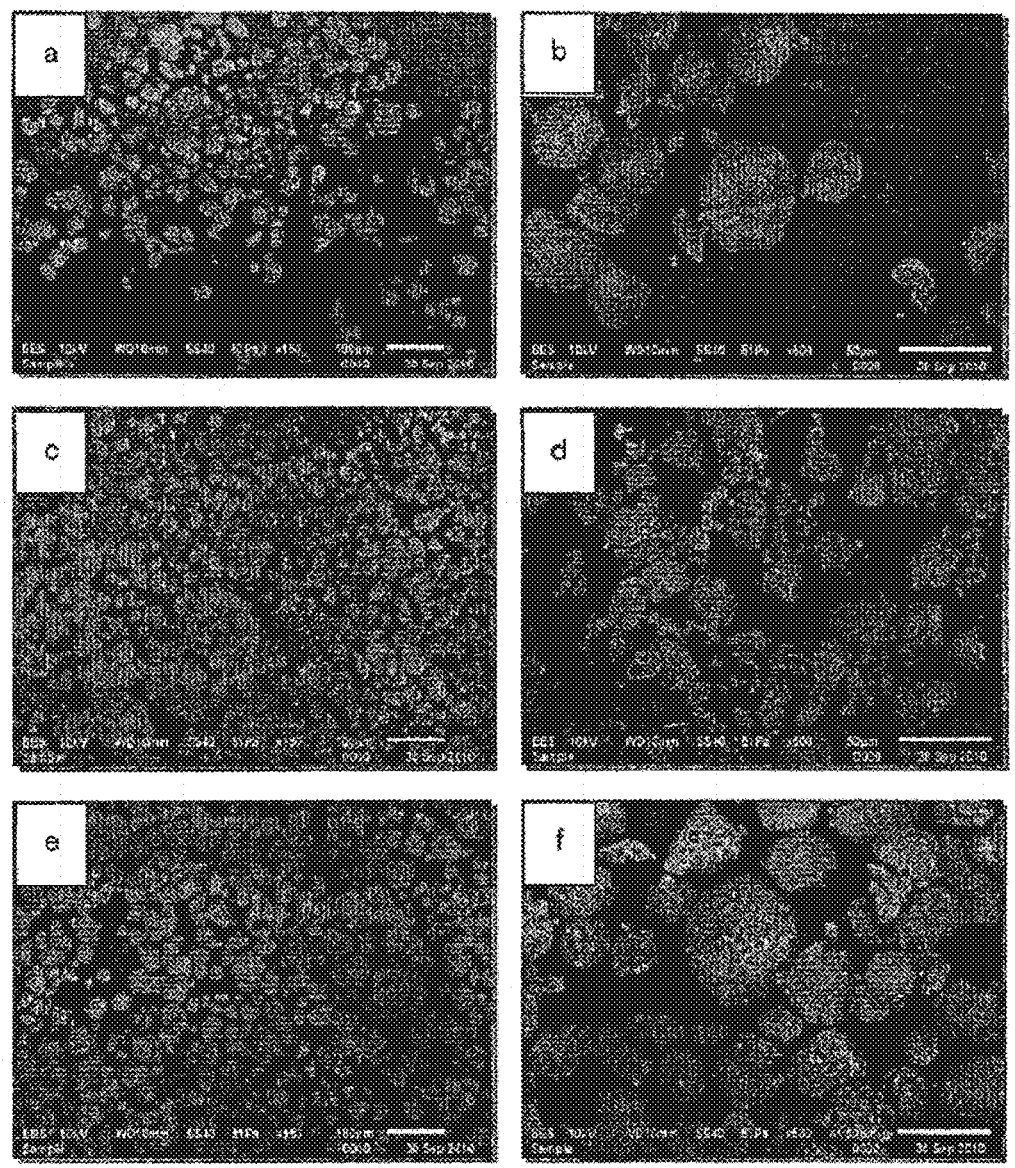
FIG. 9 shows micrographs from SEM of (a) Cat NA1 without the heat treatment at 100 times magnification; (b) Cat NA1 without the heat treatment at 500 times magnification; (c) Cat NB1 without the heat treatment at 100 times magnification; (d) Cat NB1 without the heat treatment at 500 times magnification; (e) Cat NB2 without the heat treatment at 100 times magnification; and (f) Cat NB2 without the heat treatment at 500 times magnification.
Figure 10:
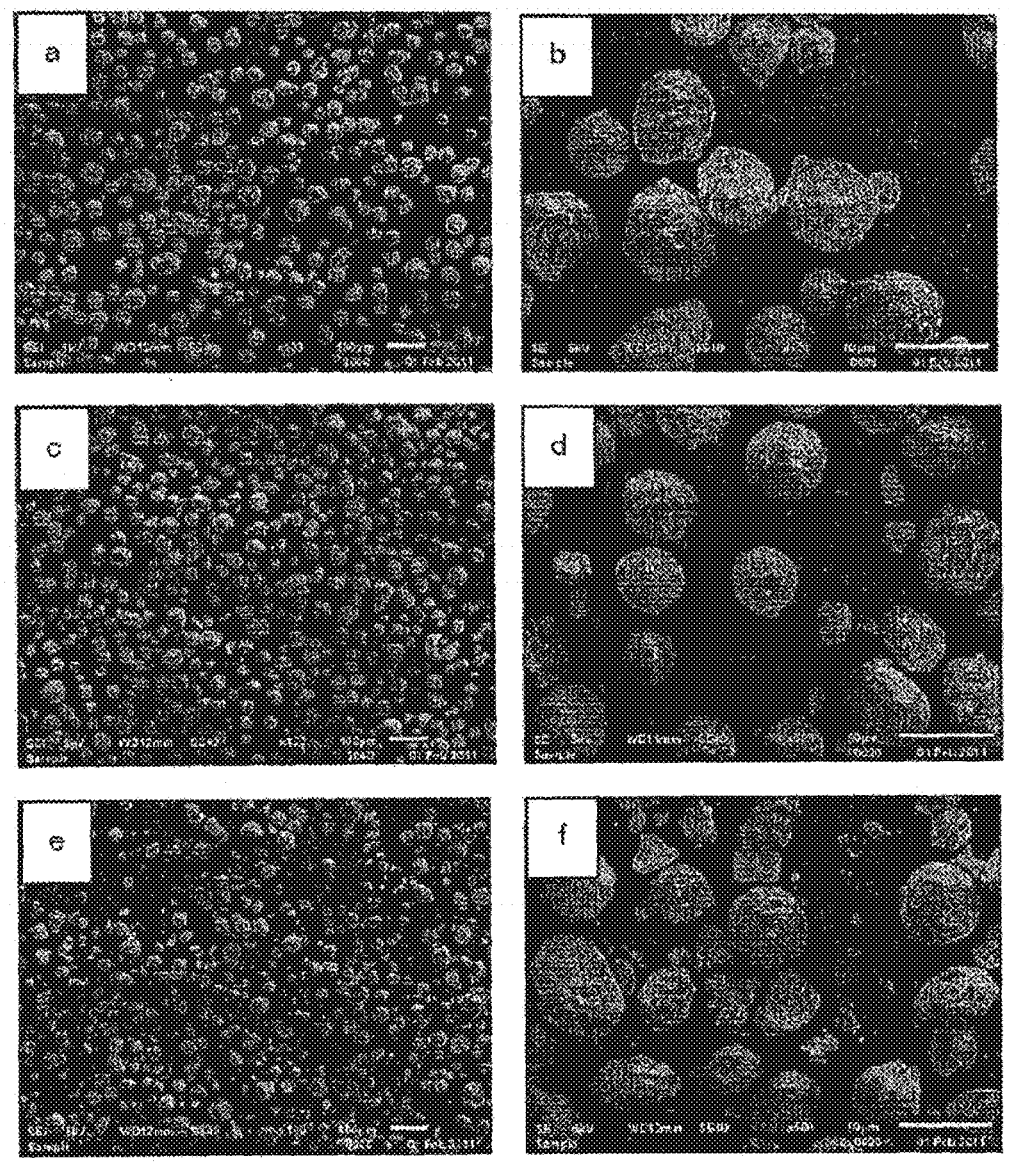
FIG. 10 shows micrographs from SEM of (a) silica with the heat treatment at 100 times magnification; (b) silica with the heat treatment at 500 times magnification; (c) Cat A1 with the heat treatment at 100 times magnification; (d) Cat A1 with the heat treatment at 500 times magnification; (e) Cat A2 without the heat treatment at 100 times magnification; and (f) Cat A2 with the heat treatment at 500 times magnification.
Figure 11:
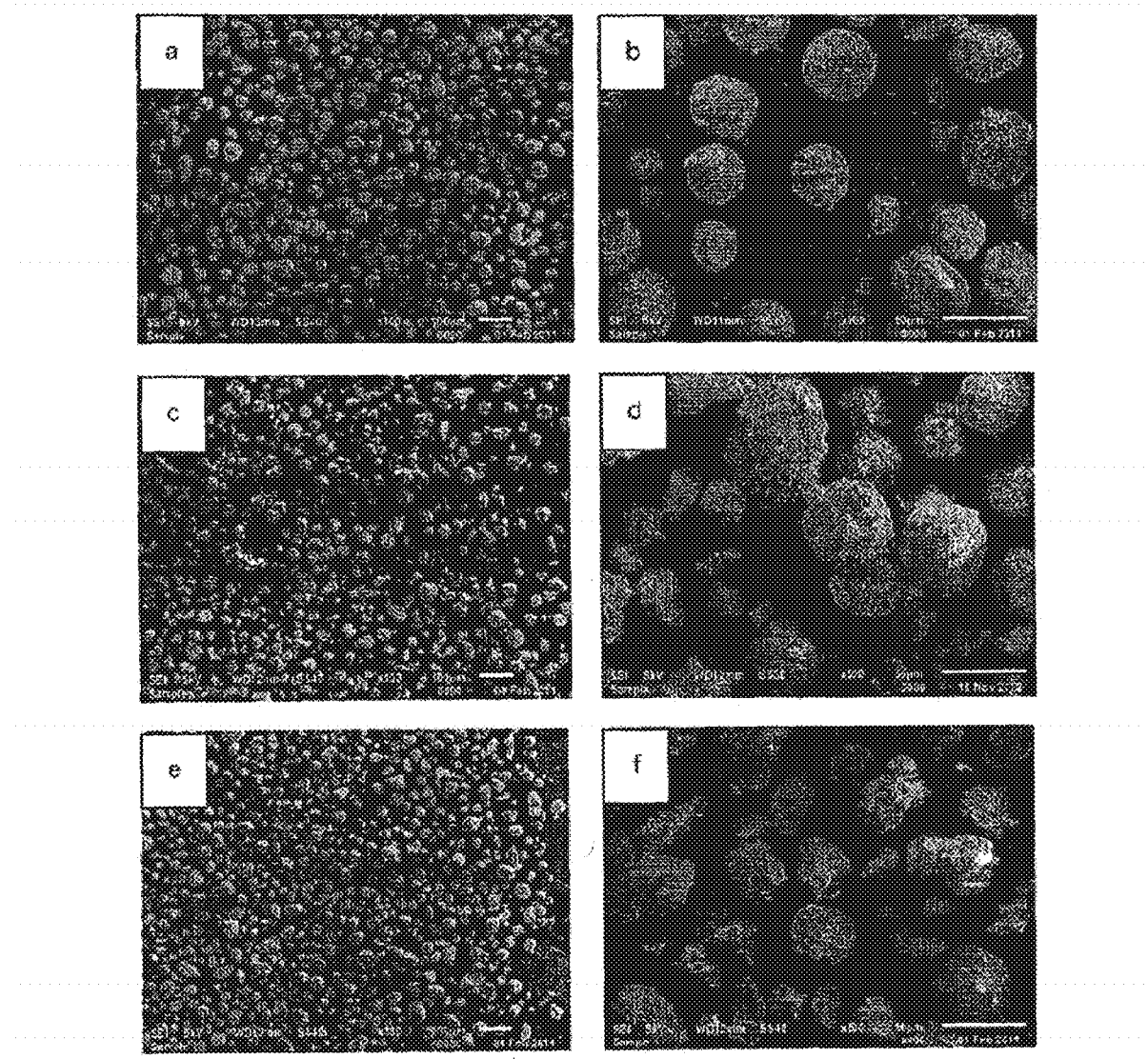
FIG. 11 shows micrographs from SEM of (a) BOS with the heat treatment at 100 times magnification; (b) BOS with the heat treatment at 500 times magnification; (c) Cat B1 with the heat treatment at 100 times magnification; (d) Cat B1 with the heat treatment at 500 times magnification; (e) Cat B2 without the heat treatment at 100 times magnification; and (f) Cat B2 with the heat treatment at 500 times magnification.
Figure 12:
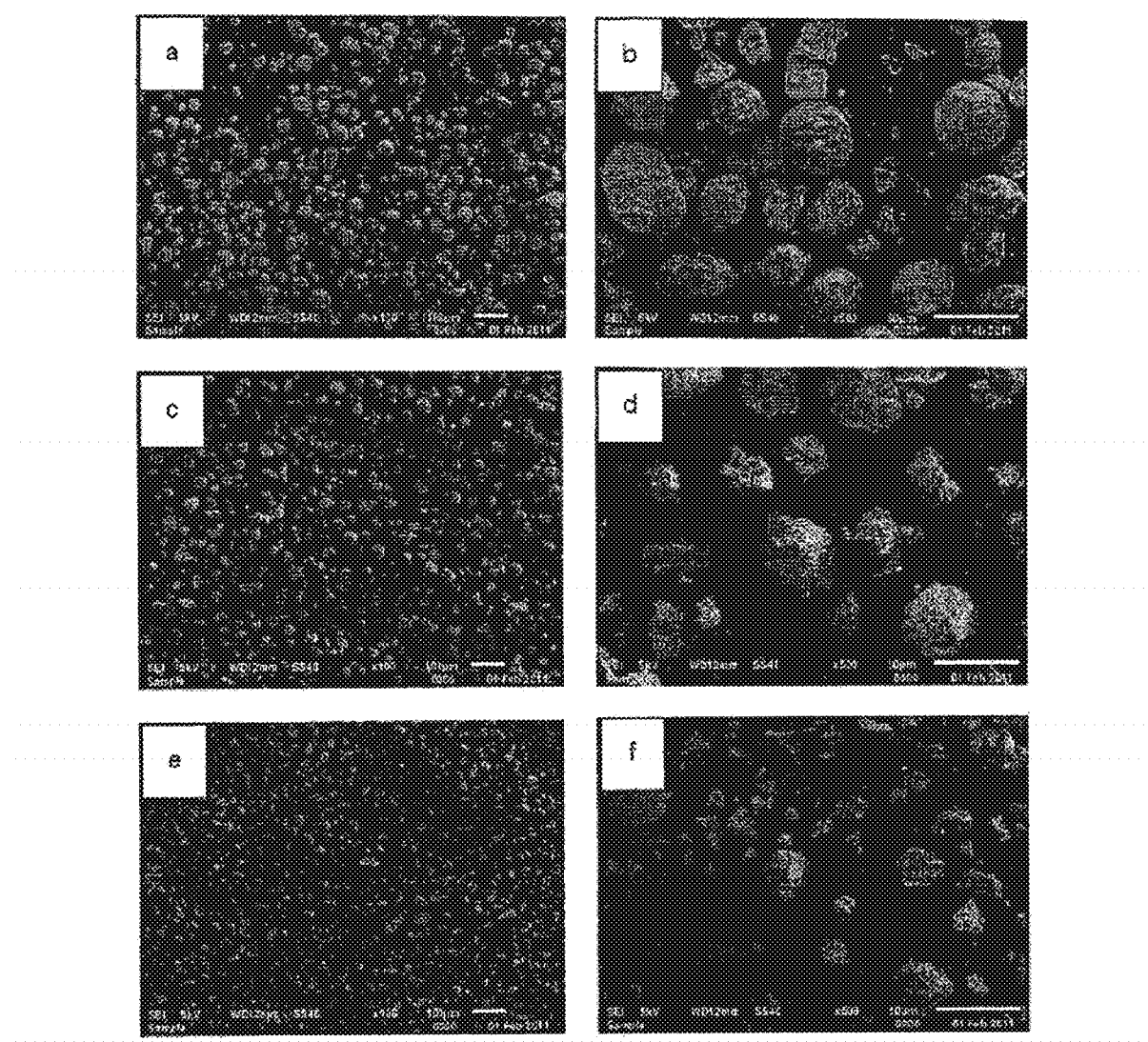
FIG. 12 shows micrographs from SEM of (a) TOS with the heat treatment at 100 times magnification; (b) TOS with the heat treatment at 500 times magnification; (c) Cat C1 with the heat treatment at 100 times magnification; (d) Cat C1 with the heat treatment at 500 times magnification; (e) Cat C2 without the heat treatment at 100 times magnification; and (f) Cat C2 with the heat treatment at 500 times magnification.
Figure 13:
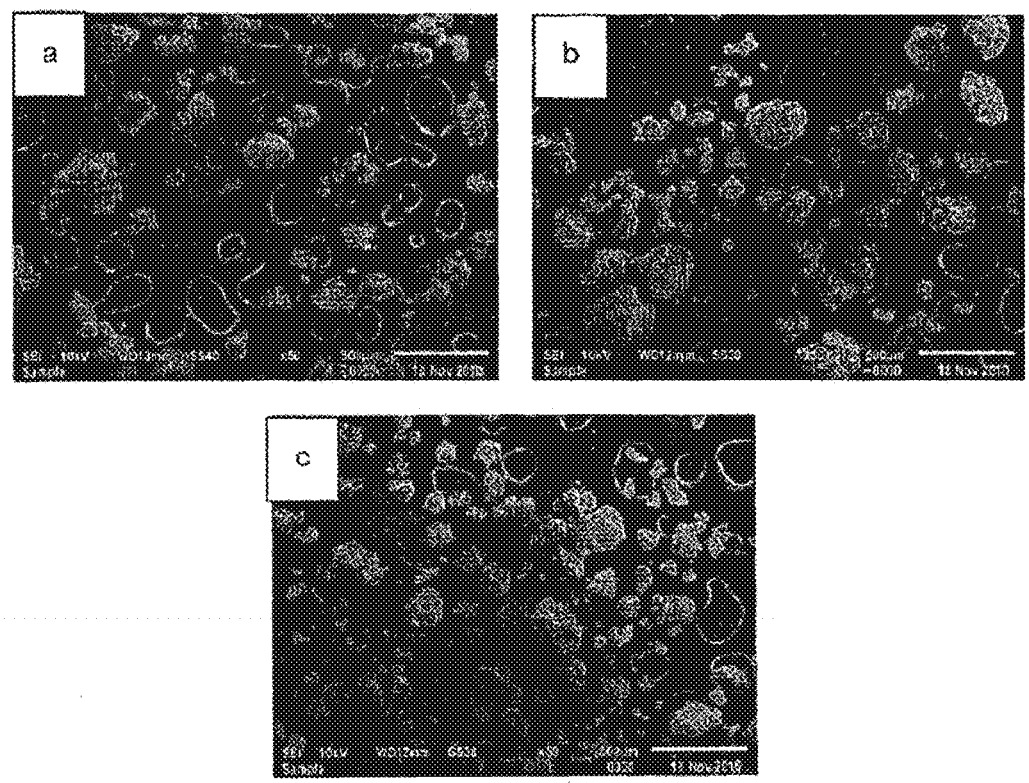
FIG. 13 shows micrographs from SEM of (a) polyethylene obtained from the catalyst NA1 at 50 times magnification; (b) polyethylene obtained from the catalyst NB1 at 50 times magnification; and (c) polyethylene obtained from the catalyst NB2 at 50 times magnification.
Figure 14:
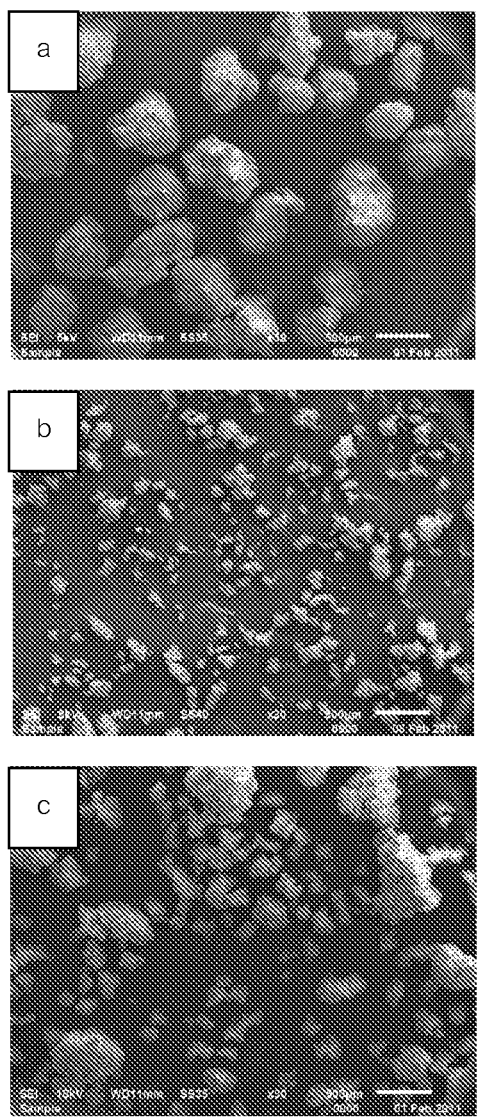
FIG. 14 shows micrographs from SEM of (a) polyethylene obtained from the catalyst A1 at 30 times magnification; (b) polyethylene obtained from the catalyst B1 at 30 times magnification; and (c) polyethylene obtained from the catalyst C1 at 30 times magnification.

As stated in the detailed description of the invention.

The invention claimed is:

1. A high activity olefin polymerization catalyst comprising a boron-containing silica support, characterized in that the support is heat treated in combination with a chemical treatment using a boron compound wherein the weight of boron relative to the support is 0.5 to 0.7%.

2. The catalyst according to claim 1, wherein the boron compound is boron halide.

3. The catalyst according to claim 2, wherein the weight of boron relative to the catalyst is 0.1 to 0.5%.

4. The catalyst according to claim 2, wherein the catalyst has chemical compositions comprising:

| Boron | 0.1-0.5% wt |
| Titanium | 4-6% wt |
| Magnesium | 2-6% wt |
| Chloride | 15-25% wt. |

5. The catalyst according to claim 1, wherein the boron compound is boron trichloride.

6. The catalyst according to claim 5, wherein the weight of boron relative to the catalyst is 0.1 to 0.5%.

7. The catalyst according to claim 5, wherein the catalyst has chemical compositions comprising:

| Boron | 0.1-0.5% wt |
| Titanium | 4-6% wt |
| Magnesium | 2-6% wt |
| Chloride | 15-25% wt. |

8. The catalyst according to claim 1, wherein the weight of boron relative to the catalyst is 0.1 to 0.5%.

9. The catalyst according to claim 1, wherein the catalyst has chemical compositions comprising:

| Boron | 0.1-0.5% wt |
| Titanium | 4-6% wt |
| Magnesium | 2-6% wt |
| Chloride | 15-25% wt. |

10. A preparation process of a high activity olefin polymerization catalyst comprising a boron-containing silica support, the process comprising the following steps:
   (a) treating the silica with heat under an inert atmosphere;
   (b) chemically treating the silica obtained from (a) using a boron compound to achieve the boron-containing silica support; and
   (c) preparing the catalyst from the silica support obtained from (b)
   wherein the catalyst has the weight of boron relative to the support is 0.5 to 0.7%.

11. The preparation process of the catalyst according to claim 10, wherein the boron compound is boron halide.

12. The preparation process of the catalyst according to claim 11, wherein step (b) has the mole ratio of silica per the boron compound of 100-300:5-9.

13. The preparation process of the catalyst according to claim 11, wherein the catalyst has the weight of boron relative to the catalyst is 0.1 to 0.5%.

14. The preparation process of the catalyst according to claim 11, wherein the catalyst has chemical compositions comprising:

| Boron | 0.1-0.5% wt |
| Titanium | 4-6% wt |
| Magnesium | 2-6% wt |
| Chloride | 15-25% wt. |

15. The preparation process of the catalyst according to claim 10, wherein the boron compound is boron trichloride.

16. The preparation process of the catalyst according to claim 15, wherein step (b) has the mole ratio of silica per the boron compound of 100-300:5-9.

17. The preparation process of the catalyst according to claim 15, wherein the catalyst has the weight of boron relative to the catalyst is 0.1 to 0.5%.

18. The preparation process of the catalyst according to claim 15, wherein the catalyst has chemical compositions comprising:

| Boron | 0.1-0.5% wt |
| Titanium | 4-6% wt |
| Magnesium | 2-6% wt |
| Chloride | 15-25% wt. |

19. The preparation process of the catalyst according to claim 10, wherein step (b) has the mole ratio of silica per the boron compound of 100-300:5-9.

20. The preparation process of the catalyst according to claim 19, wherein step (b) has the mole ratio of silica per the boron compound of 200:7.

21. The preparation process of the catalyst according to claim 20, wherein the catalyst has the weight of boron relative to the catalyst is 0.1 to 0.5%.

22. The preparation process of the catalyst according to claim 20, wherein the catalyst has chemical compositions comprising:

| | |
|---|---|
| Boron | 0.1-0.5% wt |
| Titanium | 4-6% wt |
| Magnesium | 2-6% wt |
| Chloride | 15-25% wt. |

23. The preparation process of the catalyst according to claim 19, wherein the catalyst has the weight of boron relative to the catalyst is 0.1 to 0.5%.

24. The preparation process of the catalyst according to claim 19, wherein the catalyst has chemical compositions comprising:

| | |
|---|---|
| Boron | 0.1-0.5% wt |
| Titanium | 4-6% wt |
| Magnesium | 2-6% wt |
| Chloride | 15-25% wt. |

25. The preparation process of the catalyst according to claim 10, wherein the catalyst has the weight of boron relative to the catalyst is 0.1 to 0.5%.

26. The preparation process of the catalyst according to claim 10, wherein the catalyst has chemical compositions comprising:

| | |
|---|---|
| Boron | 0.1-0.5% wt |
| Titanium | 4-6% wt |
| Magnesium | 2-6% wt |
| Chloride | 15-25% wt. |

* * * * *

UNITED STATES PATENT AND TRADEMARK OFFICE
CERTIFICATE OF CORRECTION

PATENT NO. : 9,096,696 B2  
APPLICATION NO. : 14/342568  
DATED : August 4, 2015  
INVENTOR(S) : Sutheerawat Samingprai et al.

Page 1 of 1

It is certified that error appears in the above-identified patent and that said Letters Patent is hereby corrected as shown below:

On the Title Page item 54 and in the Specification col. 1 (The Title) should read "HIGH ACTIVITY OLEFIN POLYMERIZATION CATALYST COMPRISING BORON-CONTAINING SILICA SUPPORT AND THE PREPARATION THEREOF"

Signed and Sealed this  
Twenty-sixth Day of January, 2016

Michelle K. Lee  
*Director of the United States Patent and Trademark Office*